(12) United States Patent
Coppeta

(10) Patent No.: US 7,416,674 B2
(45) Date of Patent: Aug. 26, 2008

(54) METHOD FOR FABRICATING MICRO OPTICAL ELEMENTS USING CMP

(75) Inventor: Jonathan R. Coppeta, Windham, NH (US)

(73) Assignee: Axsun Technologies, Inc., Billerica, MA (US)

( * ) Notice: Subject to any disclaimer, the term of this patent is extended or adjusted under 35 U.S.C. 154(b) by 1262 days.

(21) Appl. No.: 10/007,502

(22) Filed: Nov. 8, 2001

(65) Prior Publication Data

US 2003/0085196 A1 May 8, 2003

(51) Int. Cl.
*B29D 11/00* (2006.01)

(52) U.S. Cl. .............................. 216/24; 216/41; 216/52; 216/31; 216/88; 216/89; 216/97; 216/99

(58) Field of Classification Search .................. 216/24, 216/88, 89, 41, 52, 31, 97, 99
See application file for complete search history.

(56) References Cited

U.S. PATENT DOCUMENTS

| | | | | |
|---|---|---|---|---|
| 4,451,119 A | * | 5/1984 | Meyers et al. ................ | 359/846 |
| 4,524,127 A | * | 6/1985 | Kane ........................... | 430/321 |
| 4,744,246 A | * | 5/1988 | Busta ........................ | 73/204.26 |
| 5,500,869 A | * | 3/1996 | Yoshida et al. ................. | 372/50 |
| 5,824,236 A | * | 10/1998 | Hawkins et al. ................ | 216/26 |
| 5,958,794 A | * | 9/1999 | Bruxvoort et al. ............ | 438/692 |
| 6,010,945 A | * | 1/2000 | Wu .............................. | 438/401 |
| 6,110,015 A | * | 8/2000 | Christianson et al. ......... | 451/41 |
| 6,166,372 A | * | 12/2000 | Yamamoto et al. ........... | 250/225 |
| 6,200,908 B1 | * | 3/2001 | Vandamme et al. .......... | 438/719 |
| 6,309,900 B1 | * | 10/2001 | Maury et al. ................... | 438/16 |
| 6,489,005 B1 | * | 12/2002 | Armacost et al. ............ | 428/119 |

* cited by examiner

*Primary Examiner*—Shamim Ahmed
(74) *Attorney, Agent, or Firm*—Houston Eliseeva LLP

(57) ABSTRACT

A technique for fabricating the required surface shapes for micro optical elements, such as curved micro mirrors and lenses, starts with a simple, binary for example, approximation to the desired surface shape. Then polishing, e.g., chemical mechanical polishing (CMP), is used to form the smooth optical surface. Specifically, starting with a mesa or blind hole, with a mesa profile, a smooth mirror or lens structure is fabricated.

20 Claims, 8 Drawing Sheets

METHOD FOR FABRICATING MICRO OPTICAL ELEMENTS USING CMP

BACKGROUND OF THE INVENTION

Slight irregularities on the wafer surface—or on deposited films—can distort semiconductor patterns as they are transferred by a lithographic process to the wafer. Chemical mechanical polishing or planarization (CMP) has become the process of choice for preventing this distortion by first planarizing the wafer surface to a flat, uniform finish.

To planarize the wafer, CMP systems use an abrasive suspended in chemical slurry that levels wafer topography during mechanical polishing. In a common configuration, the wafer is held by a spinning pressure ring against a polishing pad that is held on a spinning platen.

SUMMARY OF THE INVENTION

Optical elements, such as lenses and mirrors, that are used in fiber optic systems are sometimes referred to micro optical elements. They are typically small to control beams that are typically less than a few millimeters, usually less than 500 micrometers, in diameter and can approach the 5 to 10 micrometer mode sizes found in single mode fiber at beam waists.

A number of different processes exist for fabricating micro optical elements with curved optical surfaces. They typically involve some wafer-level photolithographic patterning process followed by an etch process. For example, gray-scale and half-tone masks or photoresist reflow techniques are all directed to the objective of forming a resist layer that has a curvature, which is related to the desired optical surface. The curvature of the resist is then transferred into the substrate of the optical element, typically in a non-selective etch process. Similarly, in mass-transport processes, a binary intermediate structure is formed in the substrate using a patterned photoresist. This intermediate structure is then converted into a smooth curved optical surface in a mass transport process, which involves heating in a controlled atmosphere.

Each of these processes has different tradeoffs. The processes surrounding the formation of the curved resist layer and the subsequent etch must be well characterized and controlled to fabricate the micro optics with high yield, in a production environment. Mass transport techniques require careful control of mass transport step, which can require extended periods in an oven.

This invention relates to a technique for fabricating the required surface shapes for optical elements, such as curved micro mirrors and lenses. Starting with a simple, binary for example, approximation to the desired surface shape, polishing, e.g., chemical mechanical polishing (CMP), is used to form the smooth optical surface. Specifically, starting with a mesa or blind hole with a mesa profile, a smooth mirror or lens structure can be fabricated.

In general, according to one aspect, the invention features a method for fabricating optical elements. It comprises forming topographic features on the surface of an optical element substrate. Then, mechanical polishing is performed on the surface of the substrate to modify the features. Finally, the substrate is diced or separated into individual optical elements.

In some embodiments, the step of forming the topographic features comprises forming a blind hole having a mesa profile into the substrate. Alternatively, the step of forming the topographic features comprises forming a mesa in the substrate. The former example is relevant to the formation of concave surfaces, whereas the later is relevant to convex surfaces.

In some embodiments, when etching the blind hole, a multi-layer substrate is used. The etch is then formed into the substrate to the depth of a material layer, which acts as an etch stop. Alternatively, in other embodiments, a simple timed etch process can be used to control the height of the topographic features. In one example, silicon is used, which is etched in a reactive ion etching process.

According to the preferred embodiments, the step of polishing the surface comprises performing chemical mechanical polishing.

There are several advantages to using a polishing process, and specifically CMP, to fabricate micro optical elements. Polishing is inherently a batch process, is uniform across large wafers, and yields smooth surface finishes with roughnesses on the order of nanometers.

As a typical final step to the generation of optical elements, optical coatings are required. In one example, a highly reflective (HR) layer is deposited on the surface. This is a metal layer, such as aluminum, gold, or copper in some implementations. Alternatively, a thin film coating of alternating high and low index layers is used as the HR layer, especially when high reflectivity and/or low loss HR coating is required.

In an alternative embodiment, which is especially applicable in the context of lenses, an anti-reflective (AR) coating is deposited on the surface.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
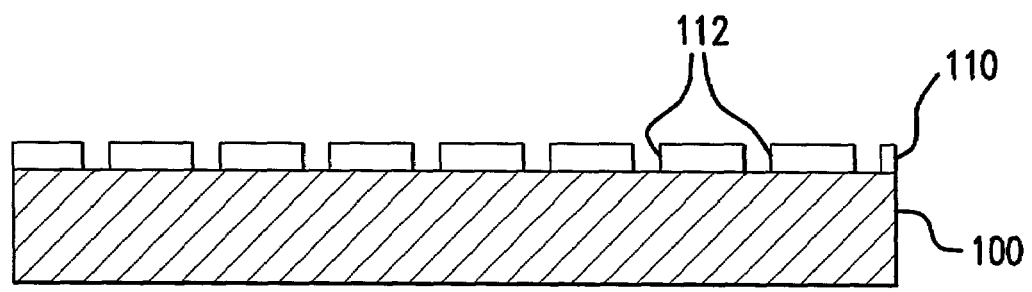
FIGS. 1A-1C are schematic, cross-sectional views showing the fabrication sequence for the formation of the optical elements in a substrate, according to the present invention.
Figure 1B:
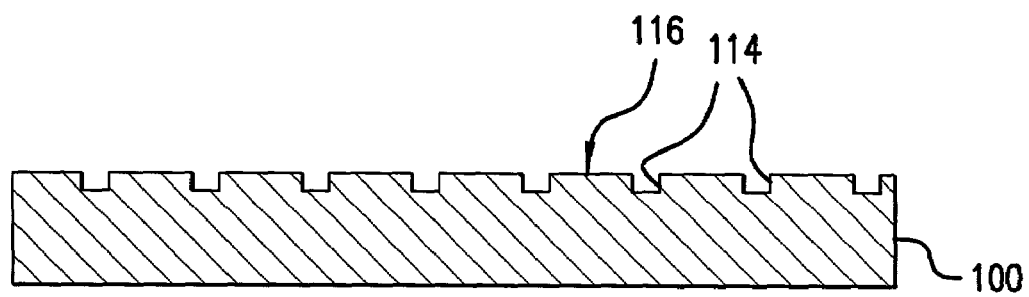
Figure 1C:
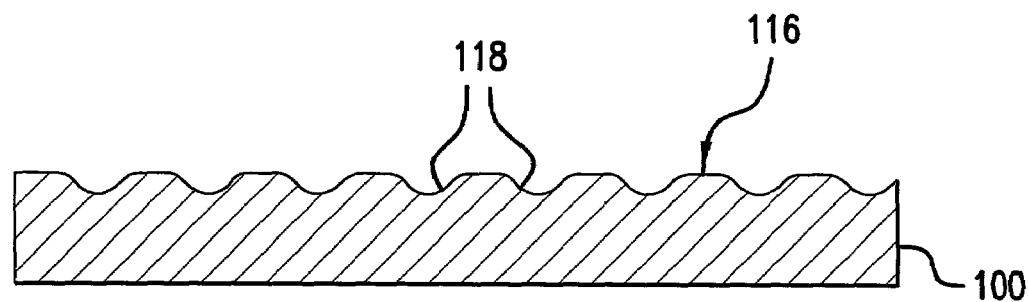

FIGS. 1A-1C show a fabrication process for optical elements, according to the present invention.

Specifically, as illustrated in FIG. 1A, a patterning layer 110 is deposited on a substrate 100. This patterning layer 110 is typically a photoresist or other photosensitive polymer. The substrate 100 is typically a semiconductor material such as silicon wafer material. Gallium phosphide is an alternative.

Generally, if the refractive optics are being fabricated, a high index substrate is typically preferred, which is further transmissive in the wavelengths of interest. When fabricating reflective optics, the transmissivity or index is less or not important.

As further illustrated in FIG. 1A, the patterning layer 110 is patterned, such as by exposure and development, to thereby expose regions, or lessen the coverage of regions, of the underlying substrate 100. Holes having mesa profiles are patterned into the patterning layer 110, in the illustrated implementation.

Next, as illustrated in FIG. 1B, the substrate 100 is etched through the holes 112 in the patterning layer 110. The depth of the resulting blind holes 114 in the substrate 100 is carefully controlled currently. A timed reactive ion etch process has been employed. Thereafter, the patterning layer 110 is stripped, if required.

Finally, as illustrated in FIG. 1C, the patterned surface or face 116 of the substrate 100 is exposed to a polishing process. In the present preferred embodiment, chemical mechanical polishing/planarization is used.

In one example, a colloidal silica slurry having a pH of about 10 with 30% loading is used. A Suba-5000 by Rodel pad is used with 1 PSI of pressure and 0.5 m/s of linear velocity.

The polishing process has the effect of rounding-over or smoothing the profiles and edges of the etched holes 114. This modification of the topographic features 114 yields a smooth concave profile 118 after sufficient polishing.

Figure 2:
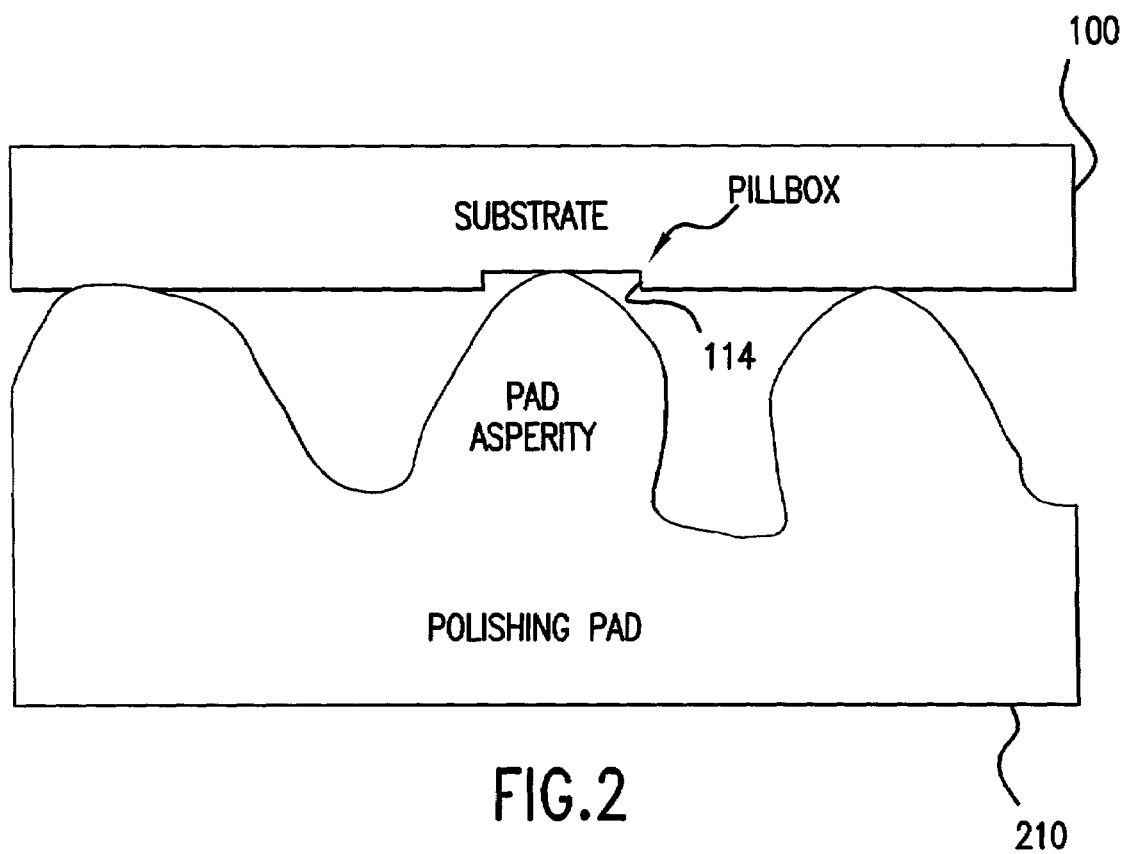
FIG. 2 is a schematic cross-sectional view illustrating the polishing action between the substrate and polishing pad, surrounding topographic feature.

FIG. 2 is a schematic cross-sectional view illustrating the interaction between the polishing pad 210 of the CMP system and the substrate 100 and specifically the blind hole 114 that has been formed in the substrate 100.

Figure 3:
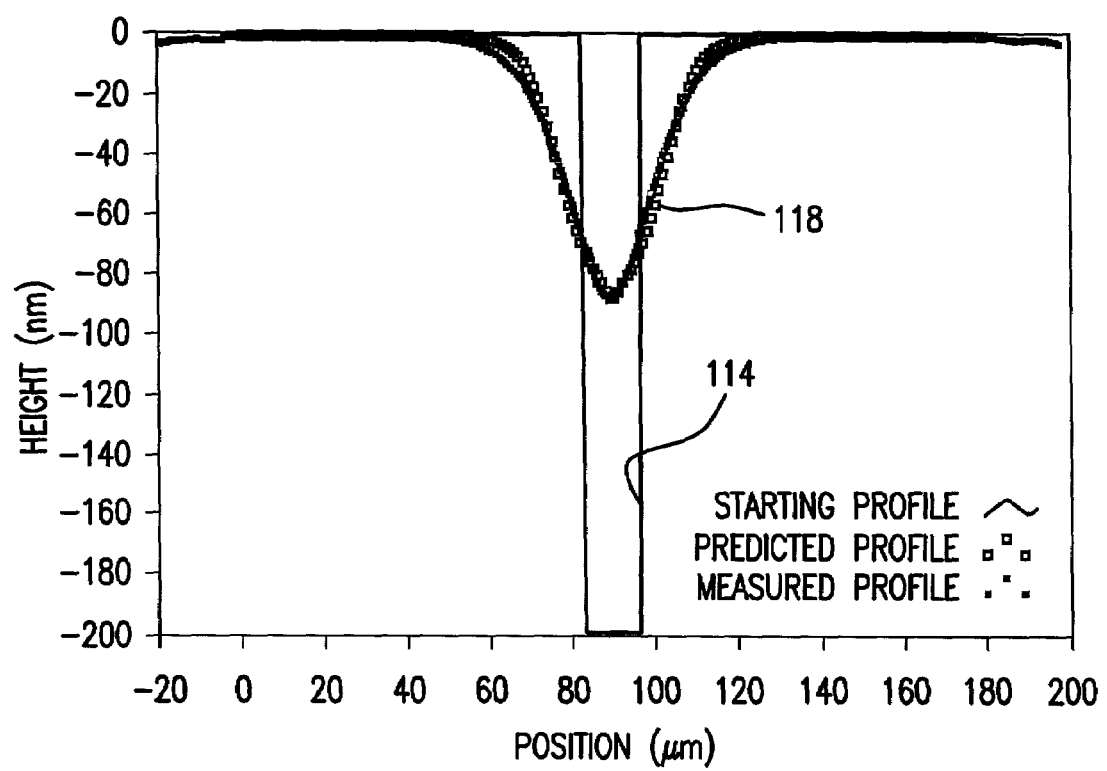
FIG. 3 is a plot of height relative to a surface of the substrate as a function of position for a starting profile, a predicted profile after polishing, and a final measured profile in the fabrication of a concave surface after polishing according to the present invention.

FIG. 3 is a plot of height in nanometers as a function of position in micrometers showing the initial pillbox or mesa profile hole 114 and the resulting smooth, concave shape 1118 that results from the CMP process, based on both from theory and actual data. The starting structure was a 14 micrometer wide by 200 nanometer deep pillbox in silicon.

Generally, longer polishes tend to decrease the overall depth of the feature from the initial pillbox feature. Additional polishing tends to widen the overall mouth of the smooth concave feature relative to the original etched pillbox or blind hole feature 114, since this is inherently a planarization process.

It is theorized that the invention uses of the asperity structures on polishing pads to polish substrate surface structures that have length scales that are similar to the pad asperity length scales. Typically, CMP asperities have length scales on the order of 10's of micrometers. It is believed that pad characteristic length scales will limit the range of possible shapes that can be achieved through the polishing process.

Knowing the characteristic length scales of a polishing pad and the starting substrate surface profile, one can predict the evolution of the profile during the polish process. Warnock (1991) developed a phenomenological model of the polish process making use of the pad length scales to predict the polishing characteristics of arrays of surface structures in the context of semiconductor device manufacturing. This simple model assumes that the local polish rate is linearly proportional to the local pressure in observance of the Preston's equation. By conserving the overall polish rate, Warnock was able to predict how different substrate topographies would polish in time.

Figure 4:
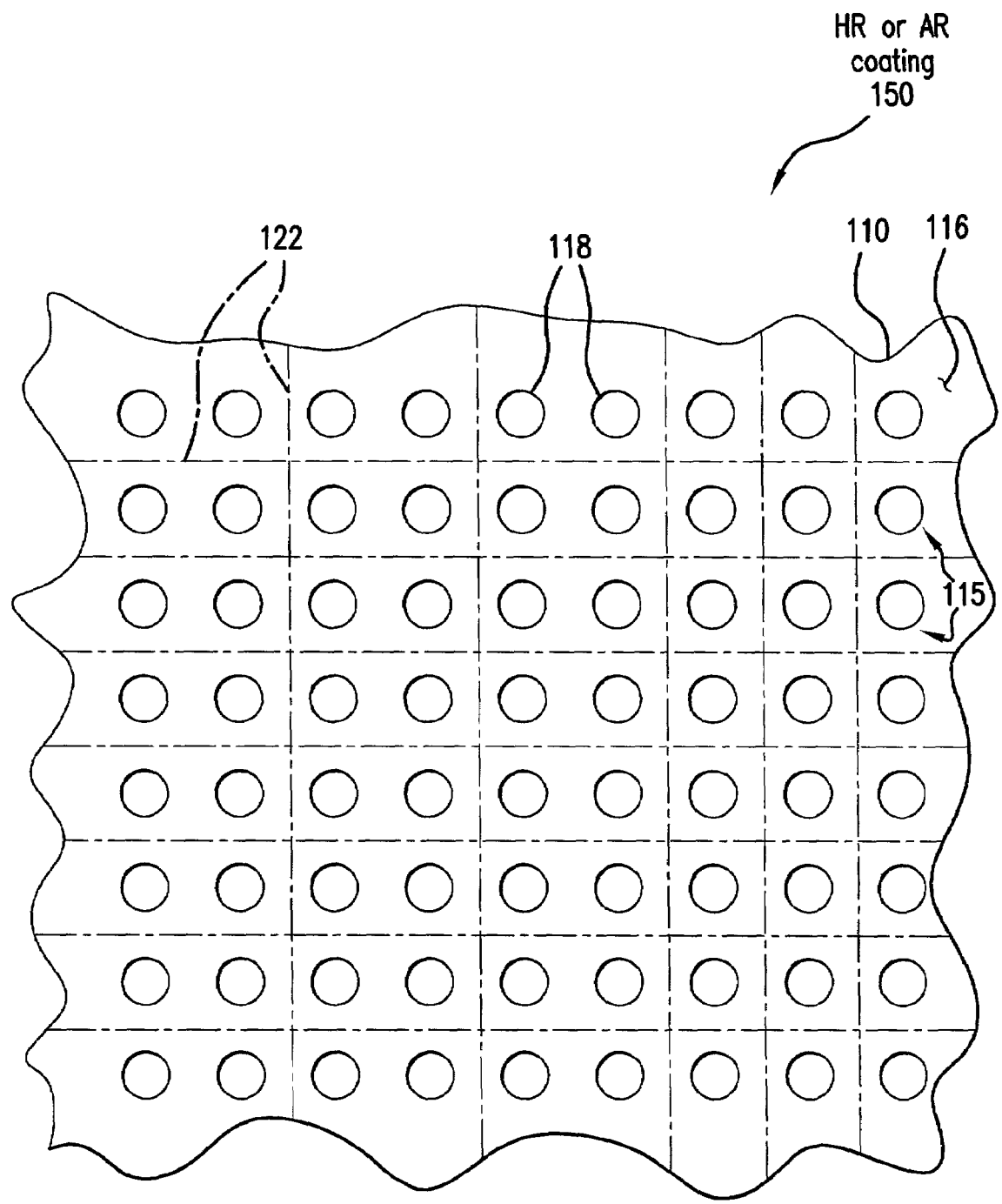
FIG. 4 is a top plan view of a region of the substrate showing the scribe or die saw lines for dicing the substrate into the individual optical elements.

FIG. 4 illustrates the final step of coating and dicing. Specifically, the now smoothed concave optical surfaces 118 that are formed on the surface 116 of the substrate 100 are typically first coated and then diced.

The coating process typically involves the deposition of a reflective or antireflection coating 150. In one example, a highly reflective (HR) layer is deposited on the surface 116. This is a metal layer, such as aluminum, gold, or copper in some implementations. Alternatively, a thin film coating of alternating high and low index layers is used as the HR layer, especially when high reflectivity and/or low loss HR coating is required. Additional metalizations are sometimes included for metal mounting of the elements 115.

The dicing typically includes a die saw or scribe and cleave process, for example. Specifically, scribe or saw lanes 122 are defined in the substrate 100 so that individual or multiple smooth concave surface features 118 are provided on individual optical elements 115.

Figure 5A:
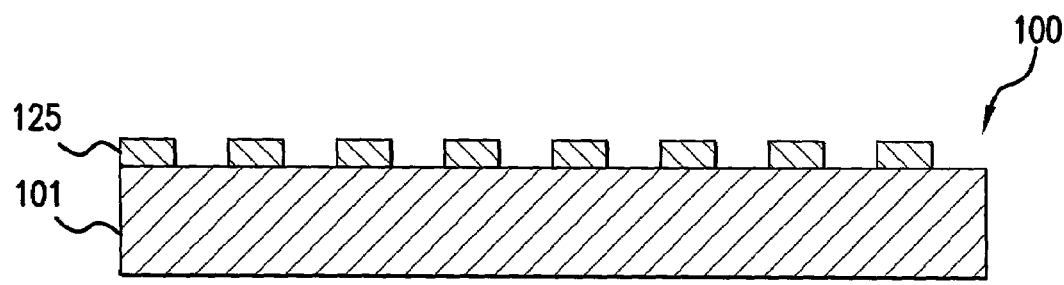
FIGS. 5A-5C are schematic, cross-sectional views showing a fabrication sequence according to another embodiment of the present invention.
Figure 5B:
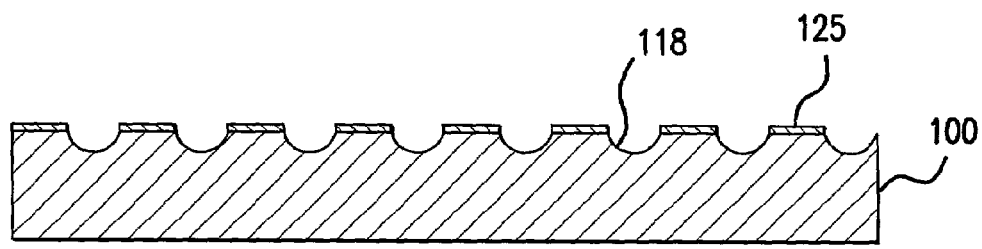
Figure 5C:
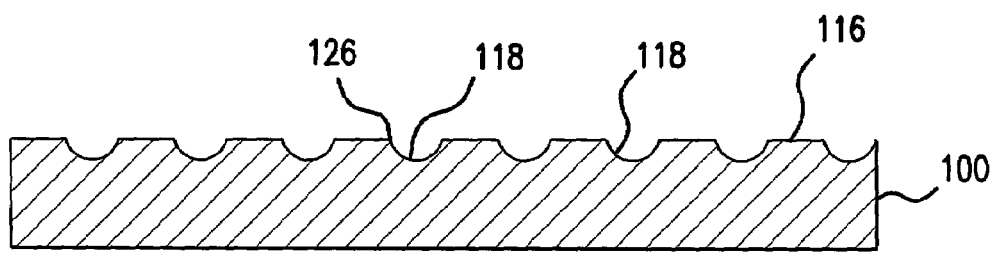

FIGS. 5A-5C illustrate an alternative embodiment in which a composite substrate 100 is used. Specifically, substrate 100 has an integral layer 125 that has been deposited or otherwise formed on a base material 101. For example, the base material 101 of the substrate 100 is a silicon wafer, and the integral surface layer 125 is an oxide layer that has been deposited or possible grown thermally on the wafer base material 101. In another example, a silicon nitride layer is formed.

This surface layer 125 is then patterned. This can be performed by depositing a patterning layer such as a photoresist and then selectively etching the surface layer 125 to the depth of the base layer 101.

Next, as illustrated in FIG. 5B, the CMP polishing process is performed. This has the effect of smoothing exposed portions of the substrate 110 and also the surface layer 125. As described previously, this polishing process results in smooth surface features 118 being polished into the substrate 100.

The advantage of this process is that the progress of the polishing process can be carefully monitored by monitoring the remaining thickness of the surface layer 125. In one example, where the surface layer 125 is silicon oxide, this can be monitored optically.

Generally, as illustrated in FIG. 5C, after polishing, the surface layer 125 is selectively removed leaving only the base material 101 of the substrate 100 with the smooth surface features 118 that had been formed into the surface 116. This is accomplished using a buffered oxide etch, for example.

The resulting profile of the holes performed using this two layer process is somewhat different than as illustrated in FIG. 1C. Specifically, smooth surface features tend to have hard transitions 126 between the smooth polished surface feature 118 and the unpolished areas of the surface.

The hard transitions 126 are avoided in some implementations by polishing the surface layer 125 completely off or polishing after the remnants of the surface layer 125 have been stripped.

Figure 6:
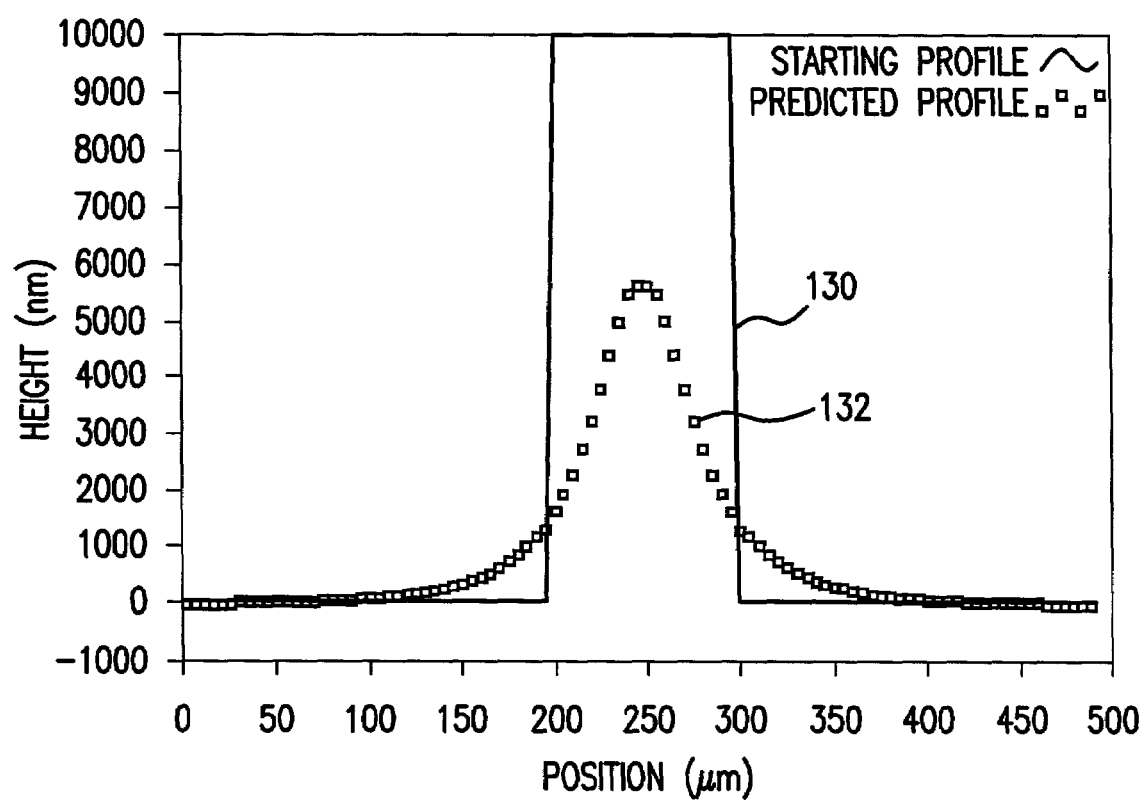
FIG. 6 is a plot of height as a function of position showing the starting profile and the predicted profile in the fabrication of a convex surface in the substrate, according to the present invention.

FIG. 6 shows the use of the present invention in the manufacture of convex smooth features in the substrate. In this example, a mesa 130 is formed in the substrate. The polishing process then converts the rectilinear mesa 130 into a smooth optical surface 132 that would be appropriate for a convex lens. This can be performed by either using the process illustrated in FIGS. 1A-1C or FIGS. 5A-5C. Typically, if the process FIGS. 5A-5C is used, the polishing process is performed until layer 125 is completely removed to yield a completely smooth surface feature.

One application of the present invention is in the fabrication of the low sag mirror structures required in the single mode hemispherical cavity Fabry-Perot etalons as described in U.S. patent application Ser. No. 09/833,139, filed on Apr. 11, 2001 by Kuznetsov, which is incorporated herein by this reference in its entirety.

Figure 7A:
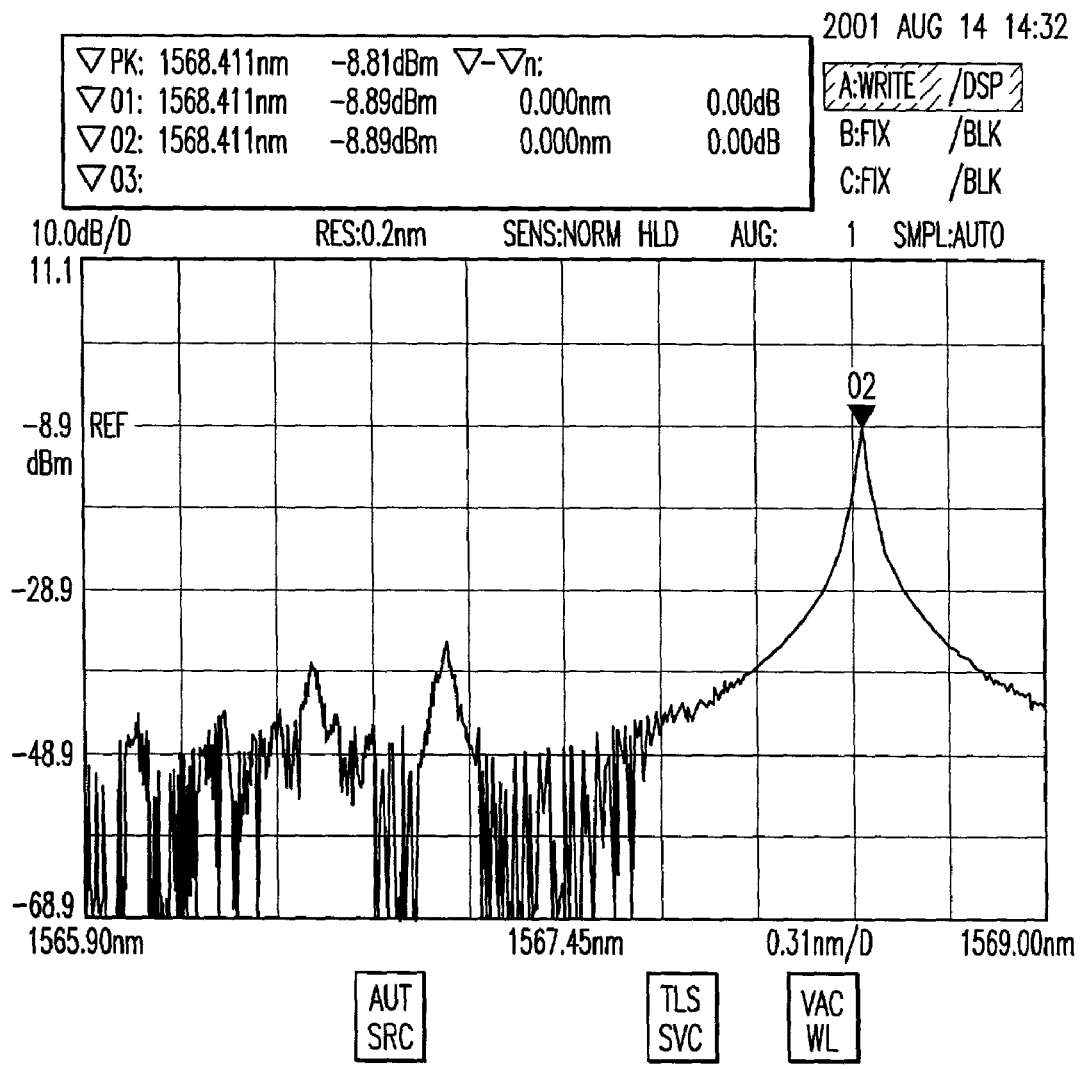
FIGS. 7A and 7B are plots of power as a function of wavelength showing the spectral responses of two Fabry-Perot etalons that were constructed from mirrors made according to the principles of the present invention.
Figure 7B:
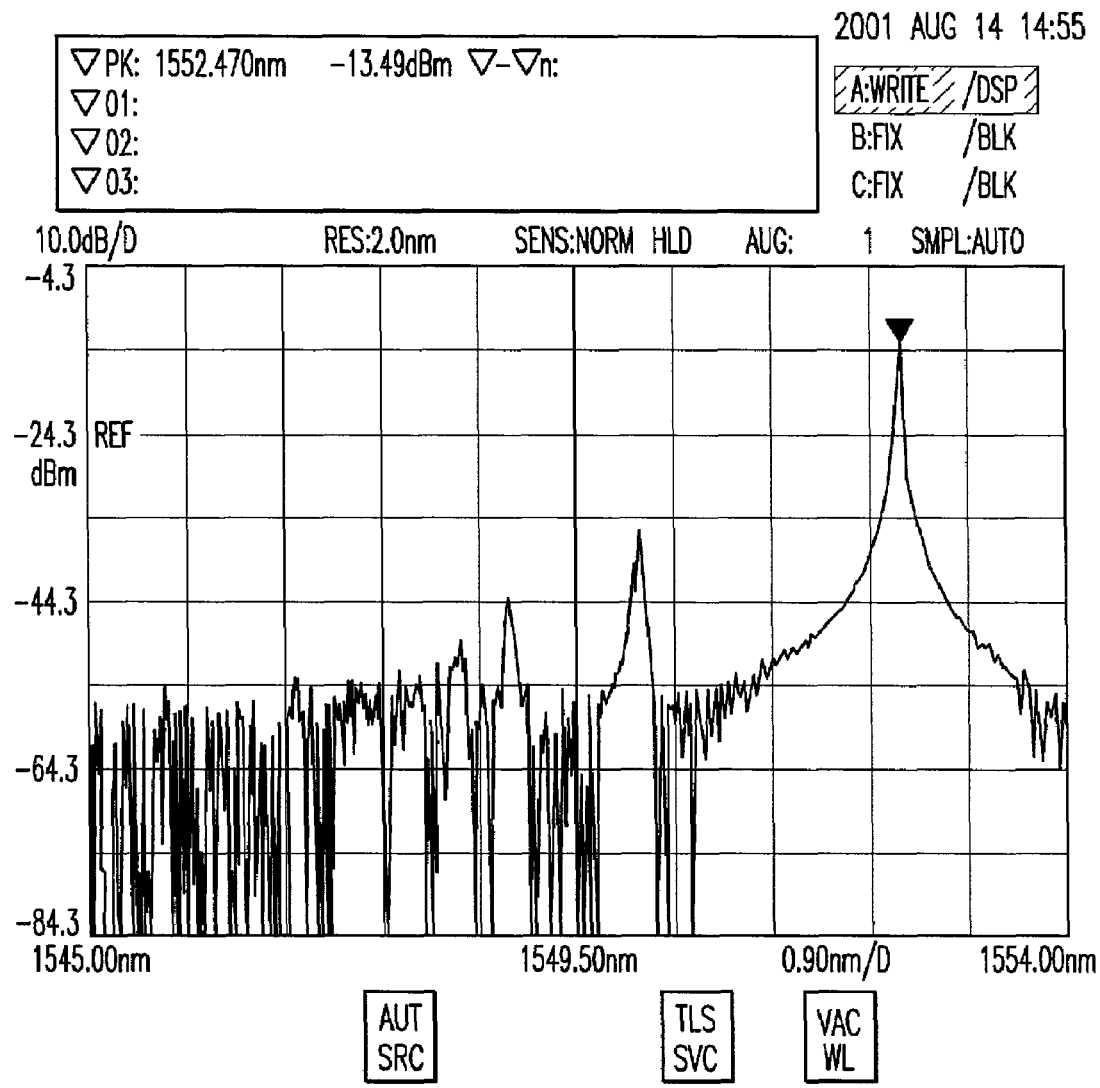

FIGS. 7A and 7B illustrate the frequency responses of hemispherical cavity etalons using the spatial mode control techniques described in the Kuznetsov applications with mirror structures having curvatures manufactured according to the present invention. The spectral responses show strong single mode behavior with the higher order modes being substantially suppressed.

Cavity 1 of FIG. 7A
V#=2
Free Spectral Range=70.04 nm
Finesse=2600
PDL=0.8 dB
Two higher order modes
Cavity 2 of FIG. 7B
V#=1.75
Free Spectral Range=70.84 nm
Finesse=2600
PDL=0.25 dB
Two higher order modes ($2^{nd}$ higher order mode finesse=1100)

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for fabricating micro-optical elements, comprising:
   forming topographic features on a surface of an optical element substrate;
   mechanically polishing the surface of the substrate to modify the features to produce curved optical surfaces on the optical element substrate; and
   dicing the substrate into the optical elements.

2. A method as claimed in claim 1, wherein the step of forming the topographic features comprises forming blind holes into the substrate.

3. A method as claimed in claim 1, wherein the step of forming the topographic features comprises forming blind holes, having mesa profiles, into the substrate.

4. A method as claimed in claim 1, wherein the step of forming the topographic features comprises forming a feature projecting from the substrate.

5. A method as claimed in claim 1, wherein the step of forming the topographic features comprises forming mesas in the substrate.

6. A method as claimed in claim 1, wherein the step of forming the topographic features comprises etching a blind holes into the sub skate to a depth of a material layer.

7. A method as claimed in claim 1, wherein the step of forming the topographic features comprises etching blind holes into the substrate in a timed process.

8. A method as claimed in claim 1, wherein the step of polishing the surface comprises performing chemical mechanical polishing of the surface.

9. A method as claimed in claim 1, further comprising optically coating the surface after the polishing step.

10. A method as claimed in claim 9, wherein the step of optically coating the surface comprises depositing a highly reflective layer on the surface.

11. A method as claimed in claim 9, wherein the step of optically coating the surface comprises depositing an antireflective layer on the surface.

12. A method as claimed in claim 1, further comprising optically coating the surface after the polishing step and before the dicing step.

13. A method as claimed in claim 1, wherein the step of dicing the substrate comprises sawing the substrate.

14. A method as claimed in claim 1, wherein the step of dicing the substrate comprises cleaving the substrate.

15. A method as claimed in claim 1, wherein the step of forming the topographic features on the surface of the optical element substrate comprises forming the features on silicon or gallium phosphide wafer material.

16. A method for fabricating reflective micro-optical elements with a concave curvature, comprising:
    forming blind holes into a surface of an optical element substrate;
    mechanically polishing the surface of the substrate to modify the blind holes to produce curved, concave optical surfaces on the optical element substrate;
    coating the optical element substrate with a reflective coating; and
    dicing the substrate into the concave optical elements.

17. A method as claimed in claim 1, wherein the step of dicing is performed in two directions to thereby separate a two dimensional array of optical elements into discrete optical elements.

18. A method as claimed in claim 1, wherein sidewalls of the topographic features extend substantially orthogonally to the surface of the substrate.

19. A method as claimed in claim 16, wherein the step of dicing is performed in two directions to thereby separate a two dimensional array of optical elements into discrete concave optical elements.

20. A method as claimed in claim 16, wherein the sidewalls of the blind holes are substantially orthogonal to the surface of the substrate.

* * * * *

UNITED STATES PATENT AND TRADEMARK OFFICE
CERTIFICATE OF CORRECTION

PATENT NO. : 7,416,674 B2  Page 1 of 1
APPLICATION NO. : 10/007502
DATED : August 26, 2008
INVENTOR(S) : Jonathan R. Coppeta It is certified that error appears in the above-identified patent and that said Letters Patent is hereby corrected as shown below:

In column 6, claim 6, line 8, delete "a".

In column 6, claim 6, line 9, change "sub skate" to --substrate--.

Signed and Sealed this

Fourteenth Day of October, 2008

JON W. DUDAS
*Director of the United States Patent and Trademark Office*